United States Patent [19]

Strickland

[11] 4,291,678
[45] Sep. 29, 1981

[54] SOLAR FURNACE APPARATUS

[76] Inventor: Benjamin W. Strickland, Box 30, Joliet, Mont. 59041

[21] Appl. No.: 64,493

[22] Filed: Aug. 7, 1979

[51] Int. Cl.³ .............................................. F24J 3/02
[52] U.S. Cl. ................................. 126/438; 126/449; 126/446; 126/451; 126/436
[58] Field of Search .............. 126/436, 438, 446, 449, 126/417, 439, 430, 428, 429, 451; 165/179; 138/38

[56] References Cited

U.S. PATENT DOCUMENTS

| | | | |
|---|---|---|---|
| 637,628 | 11/1899 | Mackay | 138/38 |
| 910,192 | 1/1909 | Grouvelle et al. | 138/38 |
| 1,575,309 | 3/1926 | Anderson | 126/449 |
| 2,760,920 | 8/1956 | Olsen | 126/451 X |
| 2,928,606 | 3/1960 | Lee | 126/451 X |
| 3,052,229 | 9/1962 | Wenger | 126/439 |
| 3,130,084 | 4/1964 | Loring | 126/451 X |
| 4,137,898 | 2/1979 | Koizumi et al. | 126/400 X |
| 4,138,061 | 2/1979 | Besack | 126/400 X |
| 4,149,856 | 4/1979 | Keller | 126/451 X |
| 4,193,389 | 3/1980 | Ku | 126/438 X |

Primary Examiner—Larry Jones
Attorney, Agent, or Firm—Arthur L. Urban

[57] ABSTRACT

A solar furnace apparatus including a reflector portion, a collector portion and a fluid transfer portion; the reflector portion including a generally dish-shaped reflective member, the reflective member having a conic section configuration with a large open face and a highly reflective internal surface, the collector portion being disposed at the focal point of the reflective member, the collector portion including a chamber formed of a plurality of concave longitudinal sections and therewith forming an enclosed chamber, inlet and outlet members communicating with the chamber, the fluid transfer portion including a conduit member connected to the inlet and outlet members of the collector portion and mechanism associated with said conduit member for circulating fluid to heat storage or heat dissipating members.

4 Claims, 4 Drawing Figures

U.S. Patent  Sep. 29, 1981  4,291,678
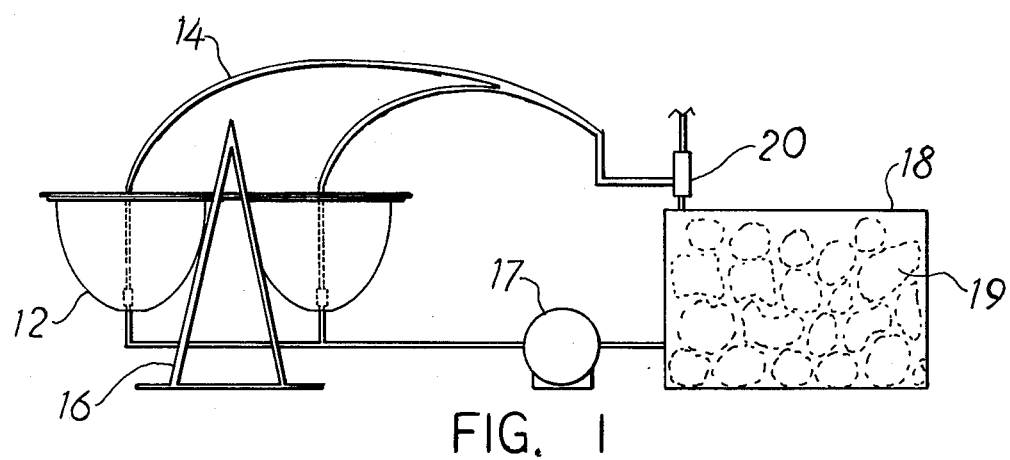
FIG. 1
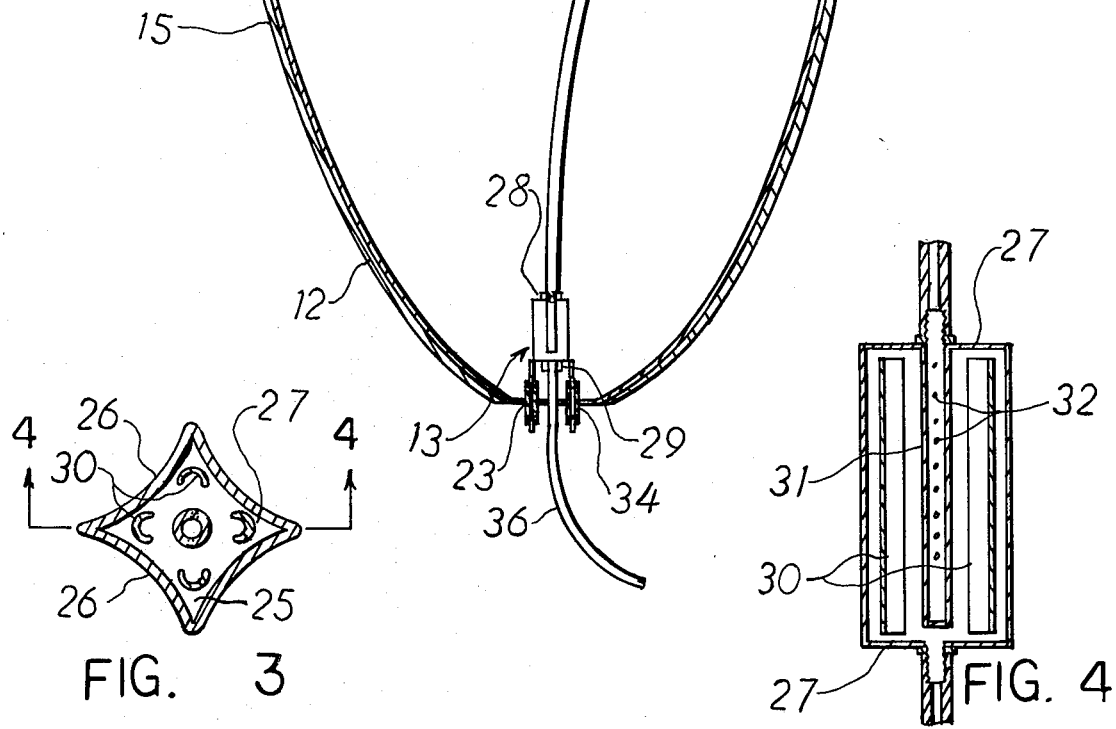

SOLAR FURNACE APPARATUS

This invention relates to a novel heating apparatus and more particularly relates to a new solar furnace apparatus.

With recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heated fluid is stored. Also, the fluid is circulated through a heat absorbing material, such as a bed of rocks which will absorb and store the heat energy for future recovery.

Since solar energy itself is free, the principal costs of solar energy systems are the initial expenditure for the solar energy converting equipment and the subsequent expense of operating and maintaining the equipment. Ideally, it is desirable to increase the temperature of the gas or liquid as much as possible during each passage of the fluid through the equipment so that a minimum size of equipment will be required to accomplish the desired absorption of heat. Thus, improving the operating efficiency of solar energy conversion systems can result in a significant savings both in capital investment and in operating costs.

Much effort has been expended on ways to improve the efficiency of solar energy systems. One area of needed improvement is the design of the actual physical structures utilized. Generally, it has been found that the more complex the system, the greater the energy recovery. However, since the costs ordinarily increase with the complexity of the system, the cost per unit of energy recovered still is relatively high. Because the costs of solar energy systems to date has been quite large, the costs exceed the available resources of the ordinary individual. Thus, the government has offered tax credits and other incentives to increase the acceptance and use of solar energy systems. However, there has been criticism of such incentives since they in effect provide an advantage for one part of the population at the expense of other tax payers.

The present invention provides a novel solar furnace apparatus with advantages and features not present on systems presently available. The solar furnace apparatus of the invention is simple in design and relatively inexpensive to manufacture. The solar furnace apparatus provides a high degree of efficiency of operation. Thus, the apparatus can be of a minimum size for a given heating requirement. Likewise, the equipment costs for a given installation can be minimized.

Another advantage of the solar furnace apparatus of the present invention is that the apparatus can be fabricated from commercially available components and materials using conventional metal working techniques. Also, the apparatus can be fabricated in small self-contained units which can be installed singly or in groups so that energy can be generated in small quantities or larger amounts as desired.

Other benefits and advantages of the novel solar furnace apparatus of the present invention will be apparent from the following description and the accompanying drawings in which:

FIG. 1 is a schematic illustration of one form of the solar furnace apparatus in a heating system;

FIG. 2 is an enlarged side view in section of the solar furnace apparatus shown in FIG. 1;

FIG. 3 is a greatly enlarged top view of the collector portion of the solar heating apparatus shown in FIG. 2; and FIG. 4 is a sectional view taken along the line 4—4 of FIG. 3.

As shown in the drawings, one form of the novel solar heating apparatus of the invention includes a reflector portion 12, a collector portion 13, and a fluid transfer portion 14. The apparatus is mounted on a frame 16 which as shown in FIG. 1 supports a pair of furnaces. The apparatus of the invention forms part of a solar heating system which may include circulating means such as pump 17 and a heat storage chamber 18 which may include a heat absorbing material such as rocks 19. The solar heating system also may include heat dissipating devices such as a radiator 20 in the room of a dwelling.

Reflector portion 12 includes a reflective member 15 and an internal surface 21 of a high reflective material. The reflective member advantageously is formed with a single surface although it may be formed of a plurality of arcuate sections which are secured together such as by welding or similar fastening expedients.

The generally dish shaped reflective member 15 has a conic section configuration, that is, semi-elliptical or parabolic-like, as shown in the drawings particularly FIG. 2. The reflective member 15 has a large open face 22 and may have a small opening 23 at the apex of the closed portion thereof.

The collector portion 13 is disposed at the focal point of the reflective member 15. The collector portion 13 includes a chamber 25 formed of a plurality of concave longitudinal sections 26 which are joined at their longitudinal edges. As shown in FIG. 3, this arrangement of the longitudinal sections 26 forms a generally star-shaped configuration. The chamber 25 of the collector portion is enclosed by end sections 27. Also, the chamber 25 includes inlet and outlet means 28 and 29 respectively.

Advantageously, the collector portion 13 as shown in FIG. 4 includes baffles or fins 30 and also central conduit means 31 which extends from one of the end sections 27 to a point adjacent the other end section. The closed end of the conduit 35 is spaced from the second end section as shown and has a plurality of openings 32 along the length thereof.

The collector portion 13 advantageously is disposed along the axis of the reflective member 15. Preferably, the concave longitudinal sections 26 of the collector portion 13 are dispored substantially parallel to the longitudinal axis of the reflective member. The sections of the collector portion 13 are formed preferably of a conductive metal such as copper, aluminum, or the like, to provide a high degree of heat transfer and to improve the operating efficiency of the apparatus.

As pointed out above, the collector portion 13 is located at the focal point of the reflector portion 12. The collector portion 13 advantageously includes mounting means shown as brackets 34 for securing the collector portion adjacent the opening 23 at the apex of the reflective member 15. The collector portion 13 may be spaced from the apex opening 23 a distance less than the length of the concave longitudinal sections 26 of the collector portion. Preferably, the distance across the collector portion 13, that is, the distance between the opposing points of the star-shaped configuration is less than the length of the longitudinal sections 26.

The fluid transfer portion 14 includes conduit means. As shown a conduit 35 connected to the inlet of the collector portion 13 and a second conduit 36 connected to the outlet 29 of the collector portion. Means are associated with the apparatus for circulating fluid to a heat storage chamber or a heat dissipating device such as radiator 20 described above.

In the operation of the solar furnace apparatus of the invention as shown in the drawings, the reflective member 15 is mounted on a frame 16 and the fluid transfer portion 14 connected into a closed system which may include a pump 17, a heat storage chamber 18 and a number of heat dissipating devices such as radiator 20. The collector portion 13 is aligned at the focal point of the reflector portion 12.

The furnace is oriented advantageously toward the sun with the opening 22 in alignment therewith. The sun's rays striking the highly reflective inner surface of the reflective member 15 are reflected toward the collector portion 13 which is positioned at the focal point of the reflective member. The rays heat the collector portion 13 which in turn heats the fluid circulating through the chamber of the collector portion 13 by means of conduit 35 and 36. The fluid may be transferred directly to a heat dissipating device such as radiator 20 by pump 17. Alternatively, if no heat is required by radiator 20, the heated fluid, that is, the gas or liquid may be pumped to a heat storage chamber 18 which may include the heat absorbing material such as rocks 19.

The above description and the accompanying drawings show that the present invention provides a novel solar furnace apparatus which is simple in design and relatively inexpensive. The solar furnace apparatus of the invention provides for the generation of heat efficiently. Also, the equipment can be of a minimum size with a significant savings in capital investment and operating costs because of the high efficiency of the apparatus of the invention. The solar furnace apparatus of the invention can be fabricated from commercially available components and materials utilizing conventional metal working techniques.

The solar furnace apparatus of the invention can be used as individual units or several combined into unitary structures. The apparatus of the invention thus provides a convenient means for generating small quantities of heat such as for a single dwelling or larger amounts such as for a business, an apartment, or groups of dwellings.

It will be apparent that various modifications can be made in the particular solar furnace apparatus described in detail and shown in the drawings within the scope of the invention. For example, the size and arrangement of the components may be changed provided they do not adversely affect the operation of the apparatus. Therefore, the scope of the invention is to be limited only by the following claims:

What is claimed is:

1. A solar furnace apparatus including a reflector portion, a collector portion and a fluid transfer portion, said reflector portion including a generally dish-shaped reflective member, said reflective member having a conic section configuration with a large open face and a highly reflective internal surface, said collector portion being disposed along the axis of and at the focal point of said reflective member, said collector portion including a chamber formed of a plurality of concave longitudinal conductive metal sections joined at their edges, the cross section of said longitudinal sections forming a generally star-shaped configuration, said concave longitudinal sections being disposed substantially parallel to the longitudinal axis of said reflective member, end sections affixed to the free edges of said concave longitudinal sections and therewith forming an enclosed chamber, a central conduit means extending from one of said end sections to a point adjacent the other end section but spaced therefrom, a plurality of discrete longitudinal baffle means disposed within said chamber around said central conduit means, inlet and outlet means communicating with said chamber, the distance across the cross section of said collector portion being less than the length of said concave longitudinal sections thereof, mounting means for the securing of said collector portion adjacent the apex of said reflective member, said fluid transfer portion including conduit means connected to said inlet and outlet means of said collector portion and means associated with said conduit means for circulating fluid to a heat storage or heat dissipating means.

2. A solar furnace apparatus according to claim 1 wherein said collector portion is spaced from said reflective member a distance less than the length of the concave longitudinal sections of said collector portion.

3. A solar furnace apparatus according to claim 1 wherein said reflective member is formed with a single surface.

4. A solar furnace apparatus according to claim 1 wherein said collector member includes internal fins.

* * * * *